UREA-PHOSPHORIC ACID CLEANING COMPOSITION

Lawrence L. Little and Gilmore Chen, Morris Plains, N. J., assignors to E. F. Drew & Co., Inc., New York, N. Y., a corporation of Delaware No Drawing. Application October 1, 1952
Serial No. 312,654

11 Claims. (Cl. 252—136)

The present invention is directed to detergent compositions, more particularly to a composition including a strong acid and adapted for heavy duty cleaning of machinery. This application is a continuation-in-part of co-pending application Serial No. 165,366, filed May 31, 1950, and entitled "Urea-Phosphoric Acid Cleaning Composition," now abandoned.

In cleaning machinery, particularly in food plants, it has been customary to utilize compositions consisting of or containing substantial amounts of free phosphoric acid in the liquid state. Usually such acid was concentrated. It served the purpose of cleaning such machinery or equipment to a fairly satisfactory result, although it is desirable to have a more effective composition for the purpose. It was highly disadvantageous in that the concentrated phosphoric acid was inconvenient to handle and ship. It often occurred that some of the phosphoric acid was spilled on the floors of warehouses or of the plant, which caused destruction and corrosion of the floors and of the shoes of the workmen. It was also difficult to handle as it was corrosive to the clothing of the worker and to the skin. Furthermore, the phosphoric acid was not fully effective in the removal of protein deposits, mineral scale and grease.

It has also been proposed to provide a preparation intended to be used for water softening purposes, which was the reaction product of phosphoric acid and urea at high temperatures, up to 200° C., to cause decomposition of the urea and the formation of ammonia, which in part combined with the phosphoric acid to give ammonium phosphate while simultaneously dehydrating the product. This material was substantially neutral and did not have the necessary detergent properties for certain industrial purposes, such as in the cleaning of machinery and equipment used in the dairy industry. The product was not intended to be a detergent but only a water softening material.

The present invention is intended and adapted to overcome the difficulties and disadvantages inherent in prior compositions of the type described, it being among the objects of the present invention to provide an acid cleaning composition in which the corrosiveness is minimized, which is easy to handle and ship and which is convenient to apply without danger to the operator or his clothing.

It is also among the objects of the present invention to provide a cleaning composition which is eminently suitable for heavy duty cleaning, particularly for machinery in the food industries, particularly in equipment for pasteurizing milk and in vacuum pans for condensing milk.

It is further among the objects of the present invention to provide a cleaning composition which is highly effective in removing deposits of protein and mineral matter and for removing oil, grease and wax and also to provide a strongly acid medium for the purpose.

In practicing the present invention there is provided the ordinary concentrated aqueous phosphoric acid solution containing about 85% of phosphoric acid. It is mixed with urea or an aqueous solution thereof in the proportions of 1 part by weight of urea to 2 parts by weight of the phosphoric acid solution. A reaction occurs without the application of heat forming a crystalline addition product which is easily handled and which is strongly acid. The solution may be warmed to hasten the reaction but a temperature substantially above room temperatures is unnecessary, and in all cases it is below the boiling point of water to avoid decomposition.

To the reaction product is added a wetting agent selected from the class consisting of cationic and non-ionic type of compounds. The amount of wetting agent may vary considerable but it has been found that in most cases at least 1% should be used, up to the maximum of 10%. Larger amounts are unnecessary as adequate wetting is obtained within the stated limits. The composition has a pH well under 4.7 and in the preferred compositions the pH ranges from 2.0 to 3.0. Suitable cationic wetting agents are: Alkyl dimethyl benzyl ammonium chloride, alkyl trimethyl ammonium chloride, alkyl benzene trimethyl ammonium chloride, di-isobutyl phenoxy ethoxy ethyl dimethyl benzyl ammonium chloride, etc. Such compounds are described in the literature, as for example, in Taub et al. Patent No. 2,087,132, dated July 13, 1937. Non-ionic wetting agents suitable for this purpose include the polyglycol ethers and any effective non-ionic agent that has pronounced surface active properties. The glycol ethers are alkyl-aryl derivatives in which the alkyl radical contains from 6 to 22 carbon atoms. The glycol contains hydrocarbon radicals having from 2 to 4 carbon atoms and the polyglycol contains from 10 to 100 glycol radicals. These polyglycol ethers are well-known in the art as exemplified by the patent to Douty et al. No. 2,396,776, dated March 19, 1946.

Additional substances may be introduced into the composition for producing additional results. Such constituents include solid, crystalline or powdered acids, acid salts, or salts of polyvalent metals. The following are examples of substances which may be used: Boric or citric acid; monosodium phosphate, ammonium nitrate; calcium lactate, calcium acetate, magnesium lactate, aluminum nitrate or lactate. Such materials have a drying effect on the urea-phosphoric acid crystals and make them more capable of absorbing liquid wetting agents. Furthermore, they increase the solubilizing action on protein deposits, and improve the emulsifying action against grease films. Such agents may be used at the rate of from 5–50% of the total weight of the finished product.

The urea provides a solvent action on proteins, whereas the phosphoric acid is effective to dissolve mineral deposits and the combination seems to have an additional effect in that both protein and minerals are removed much more effectively by the composition than by the individual constituents used separately. It is believed that the effectiveness is enhanced by the type of wetting agent added to the composition. The acid compounds increase the ability of the composition to absorb the wetting agent and render it more effective. Also the acids and acid salts act as buffers to maintain the desired range of acidity. The alkali earth metal salts and salts of aluminum have the effect of increasing the ability of the composition to remove grease from the equipment and they also act to prevent the formation of lumps of the urea-phosphoric acid reaction product.

In the use of the composition, it is dissolved in water to form a solution containing about 2 to 5% of the composition. It is applied at elevated temperatures, usually above 60° C., to the equipment to be cleaned, and if desired a scrubbing action may be used. When the cleaning operation is completed, the spent solution is removed and the equipment is rinsed with hot water to remove traces of the cleaning composition. It has been found that the composition does not attack the metals ordinarily used in the equipment of the type described. At the same time, excellent cleaning is obtained even in those cases where hard dense deposits have formed on the metal surfaces. It has been found particularly advantageous in the removal of milkstone and beerstone from processing machinery in the dairy and brewery industries.

The following are specific examples of the operation of the present invention:

Example 1

The following composition is provided:

48% phosphoric acid (85%)
24% urea
24% boric acid
4% polyglycol ether

The urea is dissolved in the phosphoric acid, causing a reaction to take place which raises the temperature of the solution. The mixture is allowed to cool with stirring, whereby a powder is formed. The boric acid is uniformly mixed into the product, rendering the same more freely flowable. The liquid wetting agent is then added and stirred into the powder.

Example 2

The following composition is provided:
48% phosphoric acid (85%)
24% urea
22% calcium lactate
6% alkyl benzene trimethyl ammonium chloride A mixture of urea and aqueous phosphoric acid is made and the reaction allowed to take place. Into the powdery product the calcium lactate is mixed to provide a uniform composition. The temperature rises as the reaction takes place and the product is allowed to cool. Thereafter the wetting agent is introduced into the mixture with stirring.

Example 3

The following composition is provided:

48% phosphoric acid (85%)
24% urea
10% boric acid
14% aluminum nitrate
4% alkyl dimethyl benzyl ammonium chloride The phosphoric acid solution is mixed with the wetting agent, and the urea added to produce the reaction product with the phosphoric acid. Separately a mixture is made of the wetting agent, boric acid and aluminum nitrate. Then the two mixtures are stirred together until a homogeneous composition is obtained.

Example 4

The following composition is provided:

40% phosphoric acid (85%)
20% urea
20% citric acid
15% calcium acetate
5% polyglycol ether The urea and the phosphoric acid are mixed and the reaction allowed to go to completion. Then the remaining constituents are mixed together and they are stirred into the urea-phosphoric acid reaction product.

Example 5

A comparative test was made with the product of the present invention and a product of the prior art, wherein phosphoric acid and urea were heated up to a temperature of 220° C. for several hours. The following table indicates the results obtained by the test:

| Solution Strength | Product | Cleaning Time, minutes |
|---|---|---|
| 0.50% | A | 172 |
| 1.00% | A | 80 |
| 0.50% | B | 40 |
| 1.00% | B | 20 |

Product A was the prior art urea phosphoric acid decomposition product, and product B was applicants' product. Both of the products were used under identical conditions for the purpose of cleaning dried and hardened milk residues. They were placed in solution in water and the treatment of the articles being cleaned was at a temperature of 130° F. The present product gave complete cleaning in a very short time, whereas the product of the prior art required about four times the time of cleaning as applicants' product.

Example 6

Comparative tests were made between the products described in Example 5, for the purpose of removing grease from metal articles including equipment used in the dairy industry. The products were dissolved in water and the cleaning operation was conducted at 130° F. The following table shows the results obtained by the comparative tests:

| Solution Strength | Product | Cleaning Time |
|---|---|---|
| 0.50% | A | Over 3 hours. |
| 1.00% | A | Over 3 hours. |
| 0.50% | B | 79 minutes. |
| 1.00% | B | 36 minutes. |

It will be noted that even with a large quantity of the prior art product, the time of cleaning remained over three hours. On the other hand, with applicants' product, the larger amounts required less time and in all cases the time required for cleaning with the present products was a fraction of that necessary with the prior art.

The present composition overcomes the disadvantages of the liquid phosphoric acid in that it may be handled readily and safely in all its phases including shipment, storage and use. The composition is considerably more effective in dissolving protein deposits, grease soils, and mineral deposits. When a quaternary ammonium germicidal agent is used as wetting agent, the product is a potent germicide and combines detergent and germicide action into one product and operation.

Although the invention has been described setting forth several specific embodiments thereof, the invention is not limited thereto as various changes in the details may be made within the spirit of the invention. For instance, the ratio of urea to phosphoric acid may be varied somewhat and within narrow limits and it has been found that such variation may be as much as 10% more or less urea than called for by the 1 to 2 ratio. It is not necessary to use concentrated phosphoric acid but the ratio of the urea thereto should remain the same. The reaction product may be formed in aqueous solution and such solution may be either concentrated or dilute. One may even start with a water solution of urea. In all such modifications, the urea-phosphoric acid ratio of obut 1:2 by weight is based upon 85% phosphoric acid in water solution. However, it is usually preferred to work with concentrated solutions of phosphoric acid and solid urea because the final product is a powder which may be readily and economically shipped.

The solid crystalline acids and acid salts, named herein, are typical of other acids both organic and inorganic, and of acid salts, such as mono-phosphates and monosulphates, which are applicable. The wetting agents need not be solids, but liquid wetting agents, such as diisobutyl phenoxy ethoxy ethyl dimethyl benzyl ammonium chloride, may be used.

These and other changes in the details of the invention may be made without departing from the principles herein set forth and the invention is, therefore, to be broadly construed and not to be limited except by the character of the claims appended hereto.

I claim:

1. An acid cleaning composition comprising a mixture of the crystalline addition product of urea and phosphoric acid, said product having a pH below 4.7, the ratio of urea to concentrated phosphoric acid by weight being about 1 to 2, with a wetting agent taken from the class consisting of quaternary ammonium cationic wetting agents and polyglycol ether non-ionic wetting agents having 10 to 100 glycol radicals.

2. An acid cleaning composition comprising a mixture of the crystalline addition product of urea and phosphoric acid, said product having a pH below 4.7, the ratio of urea to concentrated phosphoric acid by weight being about 1 to 2, with a wetting agent taken from the class consisting of quaternary ammonium cationic wetting agents and polyglycol ether non-ionic wetting agents having 10 to 100 glycol radicals, the amount of wetting agent being less than 10% of said addition product.

3. An acid cleaning composition comprising a mixture of the crystalline addition product of urea and phosphoric acid, said product having a pH below 4.7, the ratio of urea to concentrated phosphoric acid by weight being about 1 to 2, with a wetting agent taken from the class consisting of quaternary ammonium cationic wetting agents and polyglycol ether non-ionic wetting agents having 10 to 100 glycol radicals, the amount of wetting agent being less than 10% of said addition product, said composition containing at least 5% of a solid free acid.

4. An acid cleaning composition comprising a mixture of crystalline addition product of urea and phosphoric acid, said product having a pH below 4.7, the ratio of urea to concentrated phosphoric acid by weight being about 1 to 2, with a wetting agent taken from the class consisting of quaternary ammonium cationic wetting agents and polyglycol ether non-ionic wetting agents having 10 to 100 glycol radicals, the amount of wetting agent being less than 10% of said addition product, said composition containing at least 5% of a substance taken from the class consisting of citric acid, an acid salt and boric acid.

5. An acid cleaning composition comprising a mixture of the crystalline addition product of urea and phosphoric acid, said product having a pH of about 2.0 to 3.0, the ratio of urea to concentrated phosphoric acid by weight being about 1 to 2, with a wetting agent taken from the class consisting of quaternary ammonium cationic wetting agents and polyglycol ether non-ionic wetting agents having 10 to 100 glycol radicals.

6. An acid cleaning composition comprising a mixture of the solid addition product of urea and concentrated phosphoric acid having a pH below 4.7 and obtained by mixing said urea and phosphoric acid with a quaternary ammonium cationic wetting agent having wetting properties, the amount of wetting agent being less than said reaction product, the ratio of urea to phosphoric acid in said product being about 1 to 2 by weight.

7. An acid cleaning composition comprising a mixture of the solid addition product of urea and concentrated phosphoric acid having a pH below 4.7 and obtained by mixing said urea and phosphoric acid with a wetting agent taken from the class consisting of quaternary ammonium cationic wetting agents and polyglycol ether non-ionic wetting agents, said wetting agents being alkyl-aryl compounds, the amount of wetting agent being less than said reaction product, the ratio of urea to phosphoric acid in said product being about 1 to 2 by weight, and containing at least 5% of citric acid.

8. An acid cleaning composition comprising a mixture of the solid addition product of urea and concentrated phosphoric acid having a pH below 4.7 and obtained by mixing said urea and phosphoric acid with a wetting agent taken from the class consisting of quaternary ammonium cationic wetting agents and polyglycol ether non-ionic wetting agents, said wetting agents being alkyl-aryl compounds, the amount of wetting agent being less than said reaction product, the ratio of urea to phosphoric acid in said product being about 1 to 2 by weight, and containing at least 5% of an acid salt.

9. An acid cleaning composition comprising a mixture of the solid addition product of urea and concentrated phosphoric acid having a pH below 4.7 and obtained by mixing said urea and phosphoric acid with a wetting agent taken from the class consisting of quaternary ammonium cationic wetting agents and polyglycol ether non-ionic wetting agents, said wetting agents being alkyl-aryl compounds, the amount of wetting agent being less than said reaction product, the ratio of urea to phosphoric acid in said product being about 1 to 2 by weight, and containing at least 5% of ammonium nitrate.

10. An acid cleaning composition comprising a mixture of the solid addition product of urea and concentrated phosphoric acid having a pH below 4.7 and obtained by mixing said urea and phosphoric acid with a wetting agent taken from the class consisting of quaternary ammonium cationic wetting agents and polyglycol ether non-ionic wetting agents, said wetting agents being alkyl-aryl compounds, the amount of wetting agent being less than said reaction product, the ratio of urea to phosphoric acid in said product being about 1 to 2 by weight, and containing at least 5% of sodium phosphate.

11. An acid cleaning composition comprising a mixture of the solid addition product of urea and concentrated phosphoric acid having a pH below 4.7 and obtained by mixing said urea and phosphoric acid with a wetting agent taken from the class consisting of quaternary ammonium cationic wetting agents and polyglycol ether non-ionic wetting agents, said wetting agents being alkyl-aryl compounds, the amount of wetting agent being less than said reaction product, the ratio of urea to phosphoric acid in said product being about 1 to 2 by weight, and containing at least 5% of a salt of a metal taken from the class consisting of the alkali earth metals and aluminum.

References Cited in the file of this patent

UNITED STATES PATENTS

| | | |
|---|---|---|
| 2,338,987 | Watzel | Jan. 11, 1944 |
| 2,396,776 | Douty et al. | Mar. 19, 1946 |
| 2,558,167 | Beghin et al. | June 26, 1951 |
| 2,593,259 | Brissey et al. | Apr. 15, 1952 |